July 19, 1955  J. E. GREGSTON  2,713,275
SAW VISE
Filed Aug. 25, 1953  3 Sheets-Sheet 1
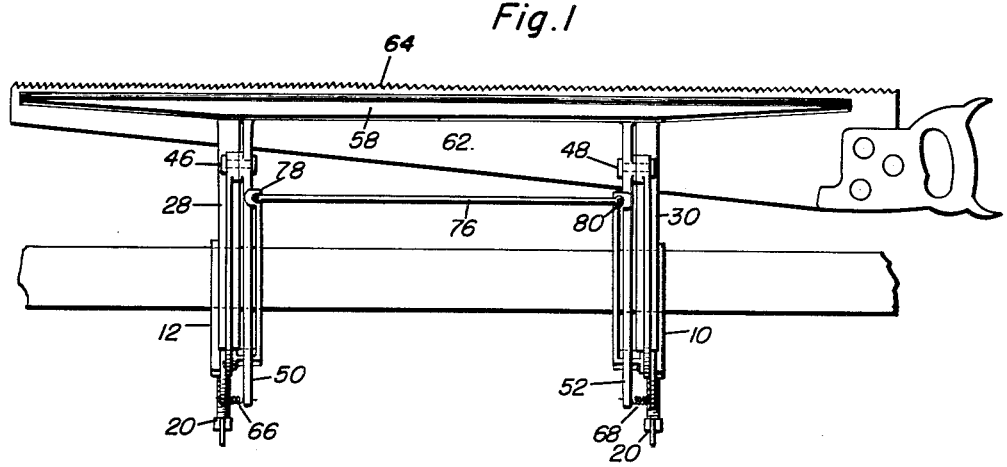
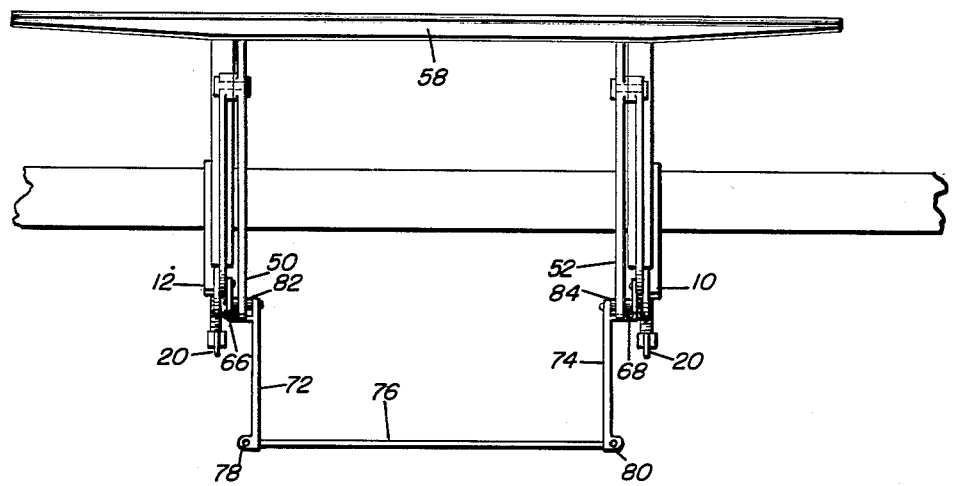
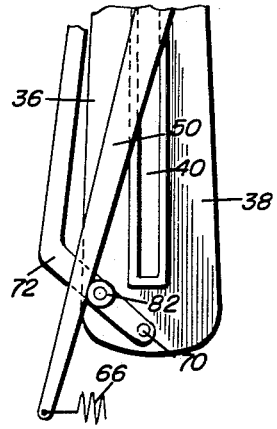
John E. Gregston
INVENTOR.

July 19, 1955

J. E. GREGSTON 2,713,275

SAW VISE

Filed Aug. 25, 1953

John E. Gregston
INVENTOR.

BY *[signatures]*
Attorneys

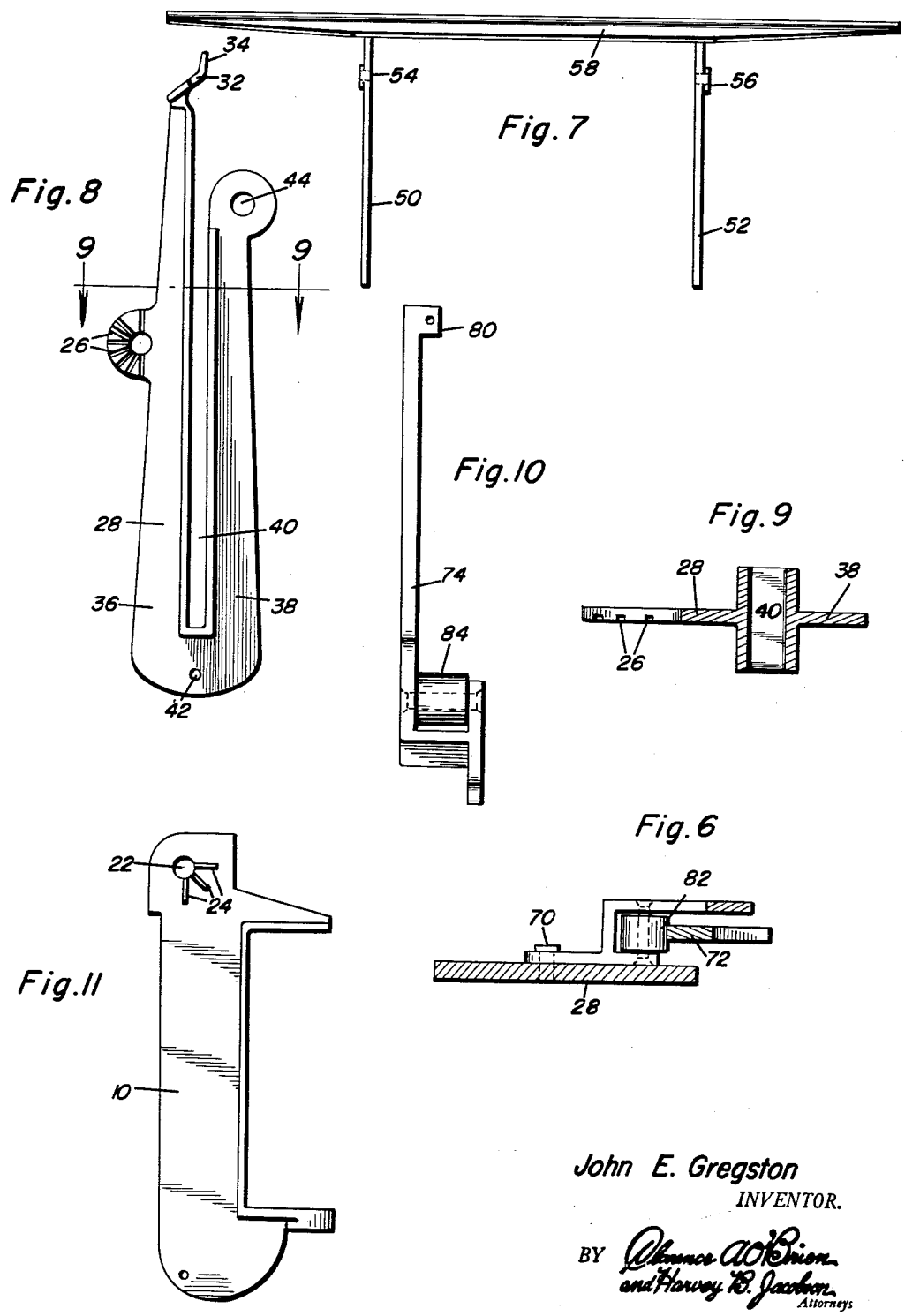

United States Patent Office 2,713,275
Patented July 19, 1955

2,713,275

SAW VISE

John E. Gregston, Tyler, Tex.

Application August 25, 1953, Serial No. 376,355

5 Claims. (Cl. 76—78)

This invention relates to a class of tools and more particularly to a device for conveniently and securely holding a saw in position for filing, sharpening, and otherwise dressing the teeth thereof.

The primary object of this invention resides in the provision of a saw vise which is so constructed as to enable a saw to be readily supported therein, and which saw vise includes resilient means for eliminating vibrations originating in the saw during the filing or sharpening processes, while also lockingly holding the saw in an adjusted position.

The construction of this invention features elongated inner and outer jaws which are mounted on spaced support members and legs respectively. Resilient means are provided for alternatively holding the jaws in an opened position, or aiding in the locking action of an angulated locking arm assembly, whereby a saw can be readily inserted in the vise and then lockingly held in an adjusted position. Means are provided on the support members for lockingly securing the support members to clamp elements which are used to attach the entire saw vise to a selected supporting surface.

One of the novel features of the assembly of this invention includes the rollers which are attached to the angulated arms and which are adapted to engage the legs on which the outer jaw is supported. The rollers provide means for continuously urging the lower portions of the legs outwardly, thereby urging the inner jaws inwardly. Still further objects and features of the invention reside in the provision of a saw vise, that is strong and durable, simple in construction and manufacture, capable of being readily attached to various existing supporting structures, which has means incorporated therein whereby the saw blade may be supported on a desired angle so that the teeth thereof may be eliminated to enable the teeth to be dressed with great facility, and which saw vise is relatively inexpensive to produce.

These, together with the various and similar objects and features of the invention which will become apparent as the following description proceeds, are attained by this saw vise, a preferred embodiment of which has been illustrated in the accompanying drawings, by way of example only, wherein:

Figure 1 is a side elevation view of the saw vise comprising the present invention shown with a saw operatively supported therein and with the jaw members in a closed position;

Figure 2 is a front elevational view of the saw vise shown in a position with the jaws open;

Figure 5 is a side elevational detail view illustrating the position of parts with the jaws in a closed position and with the rollers engaging the downwardly depending legs which are attached to the upper jaw members;

Figure 6 is a sectional detail view as taken along the plane of line 6—6 in Figure 4;

Figure 7 is a side elevational view illustrating the construction of the outer jaws and downwardly depending legs;

Figure 8 is an elevational view illustrating the construction of the support members and associated inner jaws Figure 9 is a horizontal, sectional view as taken along the plane of line 9—9 in Fig. 8;

Figure 10 is a side elevational view illustrating the construction of one of the angulated arms and associated rollers; and, Figure 11 is a side elevational view of one of the clamp members utilized in securing the vise to a supporting surface.

Figure 3:
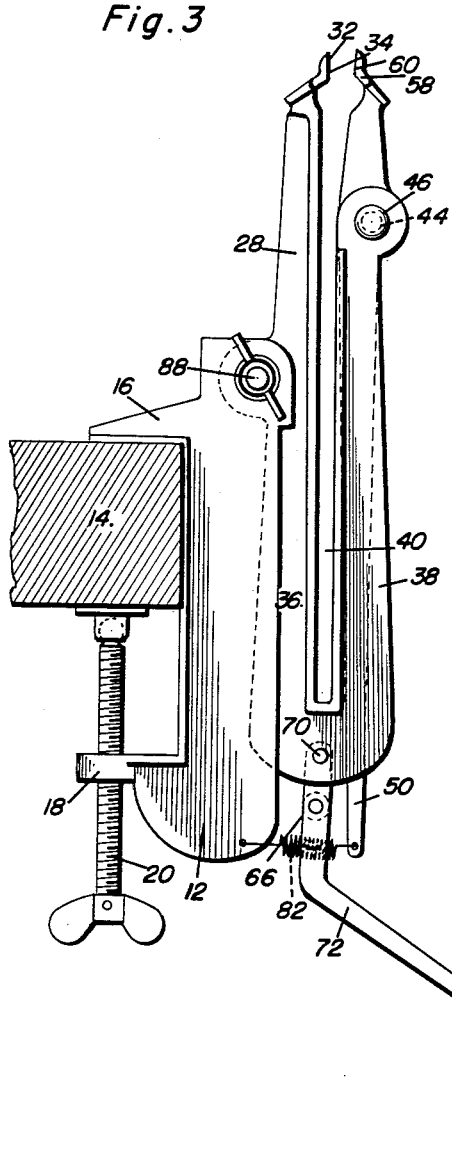
Figure 3 is a side elevational view of the invention illustrating the position of the jaws and of the other elements of the device when the jaws are in an opened position.
Figure 4:
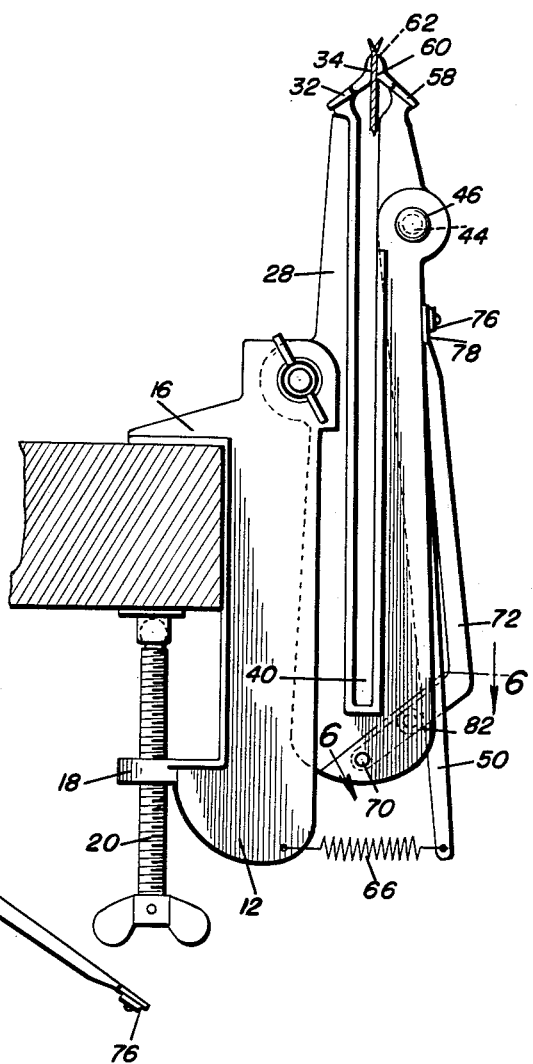
Figure 4 is a view similar to Figure 3 but illustrating the device with the jaws in a closed position.

With continuing reference to the accompanying drawings, wherein like reference numerals designate similar parts throughout the various views, reference numerals 10 and 12 generally designate clamp members used for attaching the saw vise to a suitable supporting surface, such as indicated at 14 which can be a tool bench, table top, or the like, the clamp members 10 and 12 forming a part of the saw vise comprising the present invention. Each of the clamp members 10 and 12 includes an upper lip 16 adapted to seat above the supporting structure 14 and a lower platform lip 18. Extending through the lips 18 are threaded clamp bolts 20 which are adapted to clampingly engage the lower surface of the supporting surface 14. In the upper portion of the clamp member 10 and 12, there are provided apertures 22 (Fig. 11) and a series of radially extending outwardly projecting ribs 24.

The ribs 24 are adapted to seat within slots 26 formed in the support members 28 and 30 which are spaced from each other and each of which carries an upper jaw member 32 having a substantially flat face 34 adapted to engage one side of a saw. The support members 28 and 30 are each bifurcated to form furcations 36 and 38 spaced by a central recess 40. The saw is adapted to be received within the recess 40 formed in the support members 28 and 30 and there is provided an aperture 42 at the lower portion of each of the support members 28 and 30, and another aperture 44 in each of the support members 28 and 30 at the upper portion of each of the furcations 38 which latter furcations are shorter than the furcations 36, as shown.

Pivotally attached by means of headed fasteners 46 and 48 to the top ends of the furcations 36 are a pair of downwardly extending legs 50 and 52 mounted for relative movement with respect to the support members 28 and 30. The legs 50 and 52 have apertures 54 and 56 therethrough, through which the headed fasteners 46 and 48 extend. The legs 50 and 52 carry an upper outer jaw member 58 provided with a substantially flat surface 60 adapted to oppose the surface 34 of the jaw 32 so as to hold a saw generally indicated by reference numeral 62 in position with the teeth 64 of the saw 62 extending upwardly at a desired angle predetermined by the relative position of the tongues 24 and the slots 26. Springs 66 and 68 are terminally secured to the clamp members 12 and 10, and to the legs 50 and 52 which hold the jaws 32 and 58 in an opened position as is shown in Figure 3 when the hereinafter described jaw closing means is inoperative and for maintaining an operative relationship between such means and the legs 50 and 52 when the closing means is in operative position in the manner hereinafter described.

Pivotally mounted by pins 70 extending through the apertures 42 or by other suitable fastening elements are a pair of angulated arms 72 and 74 which carry a locking bar 76 therebetween. The locking bar 76 is affixed to extensions 78 and 80 which are adapted to overlie the legs 50 and 52 so as to hold the jaw 60 in a closed position. The angulated locking arms 72 and 74 carry rollers as at 82 and 84 which are positioned to engage and apply outward thrust to the lower portions of the legs 50 and 52 when the arms 72 and 74 are swung up on the pivots 70, to force the jaw 60 into a closed position, and then hold the legs 50 and 52 against rotation, the force or energy retained in the springs 66 and 68, acting to prevent reverse swinging of the arms since it will be seen that this would require a further tensioning of the springs 66 and 68. This is because of the angular position of the rollers 82 and 84 relative to the point of relative rotary motion of the locking arms 72 and 74 and the support members 28 and 30. The extensions 78 and 80 engage the legs 50 and 52, and limit the swinging of the arms. It is to be noted that movable fasteners such as a bolt and wing nut assembly 88 extend through the apertures 22 in the clamp members 10 and 12 for lockingly holding the tongues 24 in the selected slots 26. Further, the resilient mounting of the locking arms 70 and 72 provide means absorbing the vibrations coming from the saw during the dressing operations.

Since, from the foregoing, the construction and advantages of this saw vise are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to, falling within the scope of the appended claims.

What is claimed as new is as follows:

1. A saw vise comprising an elongate support member having an upper end and a lower end, said member embodying two furcations joined at the lower end of the member and one being longer than the other, a jaw fixed to the upper end of the longer furcation, an elongate jaw leg in juxtaposed relation with the short furcation and having an upper end portion extending beyond the upper end of the short furcation, a jaw carried by the upper end of said leg for coaction with the fixed jaw, a pivot between the upper end of the short furcation and the leg, means for securing the support member in working position, spring means connected between the lower end of said leg and an element fixed relative to the leg to swing the leg in a direction to open the jaws, and means for actuating the leg to jaw closed position comprising an elongate arm having an angled end portion, means pivoting the angled end portion to the lower end of the support member on the side of the arm nearest to the longer furcation, and a thrust means carried by said angled end portion inwardly of the said pivot means, said arm having a lowered position in which the thrust means lies below the pivot means and a jaw closed raised position where the thrust means lies above the pivot means and said thrust means being spaced from the pivot means whereby it will engage and force the lower end of the adjacent arm in a direction to close the jaws against the resistance of said spring means in the pivoting of the arm from said lowered position to said raised position.

2. The invention according to claim 1, wherein said arm, when in jaw closed position, is disposed in upwardly directed juxtaposed relation with the leg, and means carried by the arm for grasping the same to facilitate swinging the arm on the pivot means.

3. The invention according to claim 1, wherein said thrust means embodies a roller member and journal means mounted on the arm and projecting laterally therefrom across the plane of the adjacent jaw leg and having the roller rotatably mounted thereon.

4. The invention according to claim 1 wherein said leg actuating means further embodies a part in parallel offset relation with the angled end portion, the pivot means securing the offset part to the support member and said offset part positioning the arm on the side of the leg remote from the short furcation and said thrust means embodying a pivot member connected between the offset part and the angled portion, and a roller on the pivot member.

5. A saw vise comprising a pair of elongate support members each having an upper end and a lower end, each said member embodying two furcations joined at the lower end of the member and one being longer than the other, a jaw fixed between the upper ends of the longer furcations, an elongate jaw leg in juxtaposed relation with the short furcation of each member and having an upper end portion extending beyond the upper end of the short furcation, a jaw carried by and connecting the upper ends of said leg for coaction with the fixed jaw, a pivot between the upper end of each short furcation and the adjacent leg, means for securing the support members in working position, spring means connected between the lower end of each leg and an element fixed relative to the leg to swing the legs in a direction to open the jaws, and means for actuating the legs to jaw closed position comprising two elongate arms each having an angled end portion, means pivoting the angled end protion of each arm to the lower end of the adjacent support member on the side of the adjacent leg nearest to the longer furcation, and a thrust means carried by said angled end portion of each arm inwardly of the said pivot means, each said arm having a lowered position in which the thrust means lies below the pivot means and a jaw closed raised position where the thrust means lies above the pivot means and said thrust means being spaced from the pivot means whereby it will engage and force the lower end of the adjacent arm in a direction to close the jaws against the resistance of said spring means in the pivoting of the arm from said lowered position to said raised position, and a bar connecting together the other ends of said arms whereby the swinging of the arms together is facilitated.

References Cited in the file of this patent

UNITED STATES PATENTS

| | | |
|---|---|---|
| 339,020 | Seely | Mar. 30, 1886 |
| 981,153 | Atkinson | Jan. 10, 1911 |
| 1,024,743 | Padrick | Apr. 30, 1912 |
| 1,172,951 | Dallis | Feb. 22, 1916 |
| 1,324,594 | Huggins | Dec. 9, 1919 |
| 1,481,728 | Morgan | Jan. 22, 1924 |
| 1,507,501 | Miller | Sept. 2, 1924 |
| 1,544,183 | Robison | June 30, 1925 |
| 2,606,462 | Queel | Aug. 12, 1952 |

FOREIGN PATENTS

| | | |
|---|---|---|
| 44,415 | Germany | Sept. 2, 1888 |